United States Patent [19]

Izumi et al.

[11] 4,453,952
[45] Jun. 12, 1984

[54] OXYGEN ABSORBENT AND PROCESS FOR THE SEPARATION OF OXYGEN AND NITROGEN USING THE SAME

[75] Inventors: Jun Izumi; Hiroyuki Tsutaya; Tatsuo Amitani; Masayoshi Kubo; Kenichi Maehara, all of Nagasaki, Japan

[73] Assignee: TDK Corporation, Tokyo, Japan

[21] Appl. No.: 516,541

[22] Filed: Jul. 22, 1983

Related U.S. Application Data

[63] Continuation-in-part of Ser. No. 402,976, Jul. 29, 1982, abandoned, which is a continuation of Ser. No. 264,973, May 18, 1981, abandoned.

[30] Foreign Application Priority Data

| May 23, 1980 [JP] | Japan | 55-67772 |
| Jun. 2, 1980 [JP] | Japan | 55-72701 |

[51] Int. Cl.³ .............................................. B01D 53/04
[52] U.S. Cl. .................................... 55/68; 55/75; 55/389; 502/66
[58] Field of Search .............. 55/58, 62, 68, 75, 389; 252/455 Z

[56] References Cited

U.S. PATENT DOCUMENTS

| 3,013,982 | 12/1961 | Breck et al. | 252/455 Z |
| 3,164,454 | 1/1965 | Wilson | 55/75 |
| 3,181,231 | 5/1965 | Breck | 252/455 Z X |
| 3,200,082 | 8/1965 | Breck et al. | 55/75 X |
| 3,255,101 | 6/1966 | Arey, Jr. et al. | 252/455 Z X |
| 3,313,091 | 4/1967 | Berlin | 55/75 X |
| 3,375,065 | 3/1968 | McDaniel et al. | 252/455 Z X |
| 3,933,974 | 1/1976 | Winquist | 252/455 Z X |
| 3,982,912 | 9/1976 | Yatsurugi et al. | 55/68 X |
| 4,056,370 | 11/1977 | Heinz et al. | 55/75 X |
| 4,166,807 | 9/1979 | Komatsu et al. | 252/455 Z X |

FOREIGN PATENT DOCUMENTS

2829703 1/1980 Fed. Rep. of Germany .......... 55/68

Primary Examiner—Robert H. Spitzer
Attorney, Agent, or Firm—Wyatt, Gerber, Shoup, Scobey and Badie

[57] ABSTRACT

Oxygen adsorbent for adsorbing oxygen from a mixed gas containing oxygen which comprises Na-A type zeolite containing iron with a valence of at least 2 or Na-A type zeolite in which a portion of Na is substituted with K and also contains iron. A process for the separation of oxygen from a mixed gas containing it by contacting the gas with the oxygen adsorbent at a low temperature to adsorb oxygen selectively.

20 Claims, 8 Drawing Figures

OXYGEN ABSORBENT AND PROCESS FOR THE SEPARATION OF OXYGEN AND NITROGEN USING THE SAME

RELATED APPLICATION

This application is a continuation in part of copending application Ser. No. 402,976, filed July 29, 1982, now abandoned which is in turn a continuation of application Ser. No. 264,973, filed May 18, 1981, now abandoned.

BACKGROUND OF THE INVENTION

1. Field of the Invention

This invention relates particularly to oxygen-selective adsorbents for the separation, removal or concentration of oxygen from the air and processes for the separation of oxygen and nitrogen using such adsorbents. It relates generally to separation of oxygen from gaseous mixtures containing it such as oxygen and argon.

2. Description of Prior Art

The principal characteristic of the separation, removal or concentration of oxygen from the air is that usually there is no cost for the starting material. The cost of the oxygen produced depends essentially upon the following factors.

(a) Costs of equipment necessary for separating or concentrating oxygen, (b) Costs of energy necessary for operating the equipment, (c) When purified oxygen is needed, the added costs of the operation.

Another characteristic is that separation or concentration of oxygen can be achieved either by separating oxygen or by separating nitrogen from air as a starting material.

Taking into consideration the above-described factors, various economically advantageous processes have heretofore been proposed. These include, for example, the process in which the air is liquified at low temperatures to separate oxygen or nitrogen making use of difference in the boiling point between liquid oxygen and liquid nitrogen. The apparatus employed is suited for producing large amounts of oxygen and the production of most of the oxygen and nitrogen in the world is based on this procedure. One disadvantage of the process is that it requires large amounts of power. Another is that large scale equipment is necessary.

Another example of a prior art separation process is the process which uses alumina silicate based high molecular weight adsorbents such as the molecular sieves developed by Union Carbide Corporation. Molecular sieves sold as "5A" and "13X" (tradenames for products of Union Carbide Corporation) have a very high adsorptivity (1.2 g N ml/100 g at NTP) for nitrogen. They have been employed in processes for the separation or concentration of oxygen by removing nitrogen selectively from the air. However, the molecular sieves of the types of "5A" and "13X" have an adsorptivity which follows Langmuir adsorption isotherm. As a result, when the pressure reaches 1.5 atmospheres absolute (ata) the increase in the adsorptivity is not large compared with the increase in the pressure. Moreover, a very large amount of nitrogen must be separated since the molar ratio of $N_2/O_2$ in the air is 4. Therefore, the advantage achieved by enlargement of the apparatus to permit the use of high pressure is rather small. This limits the application of this process to small volume installations.

Another process uses a transient metal based organic complex capable of selectively absorbing oxygen. For example, a cyclic cobalt complex called "salcomine" can absorb 1 mol of oxygen per 2 mols of salcomine. The absorption by salcomine is reversible with changes in temperature and pressure so that it is theoretically possible to achieve separation or concentration of oxygen by means of a temperature increase-temperature decrease cycle or a pressure increase-pressure decrease cycle of the air. However, in practice, severe deterioration of the organic complex occurs with repeated cycles of absorption and liberation of oxygen. Moreover, the organic complex itself is expensive. Therefore, the use of this process is limited to special situations.

In addition to the above, there are other procedures which have not yet been put to practical use but are considered to be promising in theory. For example, filters capable of selectively permeating oxygen, oxygen pumps using zirconium oxide, and other procedures known to those skilled in the art.

As suggested above, the methods for the separation, removal or concentration of oxygen can generally be classified into two groups from the practical viewpoint. For small volumes of oxygen production a pressure swing process is used in which nitrogen is removed from the air using molecular sieves. For large volume oxygen production, a deep cooling separation process is used in which the air is liquified at an extremely low temperature. It presently appears, based on known technology, that the ultimate improvements in costs and efficiencies for these processes have been reached.

SUMMARY OF THE INVENTION

A principal object of this invention is to improve the defects of the above-described conventional processes for producing oxygen.

Another object is to provide processes using smaller equipment.

Still another is to provide oxygen adsorbents for adsorbing oxygen from a mixed gas containing oxygen and nitrogen which comprises a Na-A type zeolite with adsorbed divalent iron.

Still another is to provide a process for the separation of oxygen and nitrogen from a mixed gas using the novel adsorbents.

Another object of this invention is to provide oxygen adsorbents of the class described above in which a portion of the Na is replaced with K, and the utilization of such adsorbents for the separation of oxygen and nitrogen from mixed gases containing them.

BRIEF DESCRIPTION OF THE DRAWINGS

Other objects and features of this invention will be apparent from the following description with reference to the accompanying drawings, in which.

DESCRIPTION OF PREFERRED EMBODIMENT

It has now been found that Na-A type zeolite does not adsorb oxygen selectively at room temperature when it is charged in an adsorbing column and air is passed therethrough at high pressures but behaves, like the above-described molecular sieves "5A" and "13X", as a nitrogen-selective adsorbent. Na-A type zeolite containing Fe obtained by contacting Na-A type zeolite with iron having a valence of at least 2 in a wet condition and then heating the zeolite at a temperature of about 450° C. shows an increased selectivity to oxygen and also an increased amount of oxygen adsorbed in a single component system. The heat treatment distributes some of the iron in the crystal lattice of the zeolite and is regarded as dissolved in the zeolite. The balance of the iron is deposited on the surface of the zeolite. For purposes of this disclosure and claims such dissolved and deposited iron is said to be "contained" in the zeolite.

Further, in addition to the finding that pure Na-A type zeolite shows an increased selectivity for oxygen in a system containing oxygen and nitrogen as the temperature decreases, it has also been found that Na-A type zeolite containing Fe has excellent oxygen selectivity as compared with pure Na-A type zeolite in higher temperature regions.

As far as is known, such behavior of the Na-A type zeolite containing Fe in the selective oxygen adsorption had not been discovered previously. Na-A type zeolite is described in U.S. Pat. No. 3,013,982.

Na-A type zeolites containing iron which can be used in this invention were prepared by the following procedures.

Initially, Na-A type zeolite powders such as those produced by Union Carbide Corporation were thoroughly washed with water. After boiling the powders in an aqueous NaCl solution at 100° C. for 1 hour they were again washed with water to obtain a starting material for use in subsequent steps. This treatment is used because usually the Na-A type zeolite powders contain impurities such as about 0.1 wt % of K, about 0.05 wt % of Ca, about 0.05 wt % of Mg, etc., and can be purified by the above treatment to such an extent that the amount of total impurities is 0.1 wt % or less. A total of 50 g of the purified powders was added to 1 l of deionized water and stirred to form a slurry while bubbling N₂ gas through the slurry to remove dissolved oxygen, thereby preventing oxidation of Fe ions. Then, an aqueous FeCl₃ solution was added dropwise to the slurry and stirring was continued for another hour. The pH of the aqueous slurry was about 8.5 to 9. Therefore, the FeCl₃ is presumed to have been transformed to a Fe-(OH)₃ colloid most of which adheres to the Na-A type zeolite.

Figure 1:
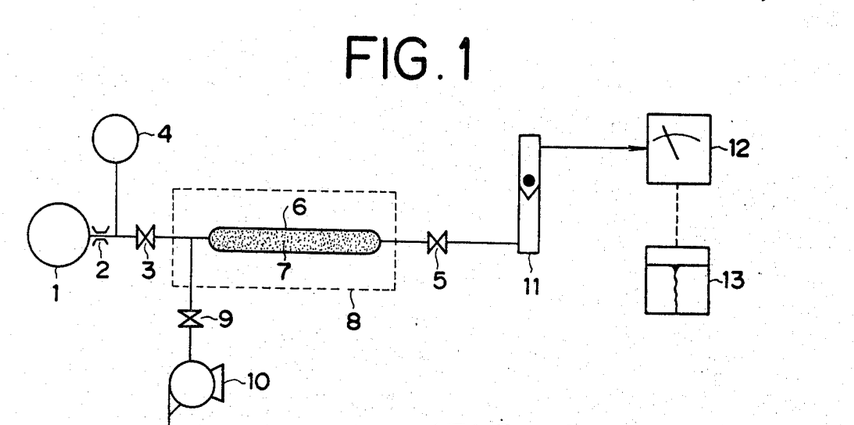
FIG. 1 shows a flow chart of a testing apparatus used for practicing the invention on a small scale.

After dehydration, the slurry thus obtained was charged in an adsorbing column as illustrated in FIG. 1 and oxygen adsorptivity from the air was confirmed. In this experiment, two kinds of Fe-added slurries were employed. One contained 0.5 wt % and another contained 1 wt % Fe calculated as Fe₂O₃ by adjusting the amount of FeCl₃ added.

After removing water from the Fe-adhered Na-A type zeolite in the adsorbing column using a vacuum filter and predrying at 100° C. in an air bath, the zeolite was heated in a vacuum heating bath at 0.1 Torr and 450° C. for 1 hour to deposit Fe on the Na-A type zeolite. Quality control of the amount of Fe deposited on the Na-A type zeolite was followed by ESR and the distribution of Fe concentration in the cross-section of crystals.

For the preparation of Fe-containing Na-A type zeolite, FeCl₂, Fe(CH₃CO₂)₂, Fe(NO₃)₂, Fe(NO₃)₃, etc. were also used in addition to FeCl₃ mentioned above. No difference in the final adsorptivity has been observed. This is presumably because after dropwise addition, all of these compounds form Fe(OH)₂ or Fe(OH)₃ which finally deposits on the Na-A type zeolite upon dehydration for form bondings such as etc.

Hereinaffter, the air separability of Fe-deposited Na-A type zeolite will be explained in greater detail with reference to the drawings.

FIG. 1 is a schematic illustration of an apparatus designed to measure the air separability of the Na-A type zeolite. Reference numeral 1 indicates a high pressure air cylinder. High pressure air discharged from the cylinder is supplied, via a decompressor 2, to a valve 3. A Bourdon's tube barometer 4 is arranged between the decompressor 2 and the valve 3 to permit measurement of the pressure. In one experiment the inlet pressure was adjusted to 5 ata by means of the decompressor 2 and the Bourdon's tube barometer 4. A stainless steel adsorbinhg column 6 having an inner diameter of 10 mm and a length of 300 mm was charged immediately after washing with water with the Na-A type zeolite 7 which did not show any adsorptivity. For this reason, the adsorbing column 6 was arranged in a temperature control bath 8 capable of being adjusted of its temperature over the range of from −70° C. to 600° C. In order to pretreat the adsorbent, valves 3 and 5 were closed and valve 9 was opened. The pressure in the adsorbing column was reduced to 0.1 Torr using a vacuum pump 10, the temperature controlling bath 8 was adjusted to 450° C. and dehydration treatment was carried out for 1 hour. Then, after the bath was cooled again to room temperature, valves 3 and 5 were opened to pass the high pressure air which was fed in toto, via a float type flow meter 11, to an oxygen densitometer 12 to measure the outlet $O_2$ concentration. The data thus obtained were recorded with an automatic recording meter 13.

Using testing apparatus as illustrated in FIG. 1 the adsorbing column 6 was charged with (1) Na-A type zeolite powder free of iron, (2) Na-A type zeolite powders containing 0.5 wt % of iron, or (3) Na-A type zeolite powders containing 1 wt % of iron, each in an amount of 15 g and the inlet gas flow rate was set at 100 N ml/min. The inlet air pressure was set at 5 ata to measure changes in the outlet oxygen concentration with the lapse of time.

Figure 2:
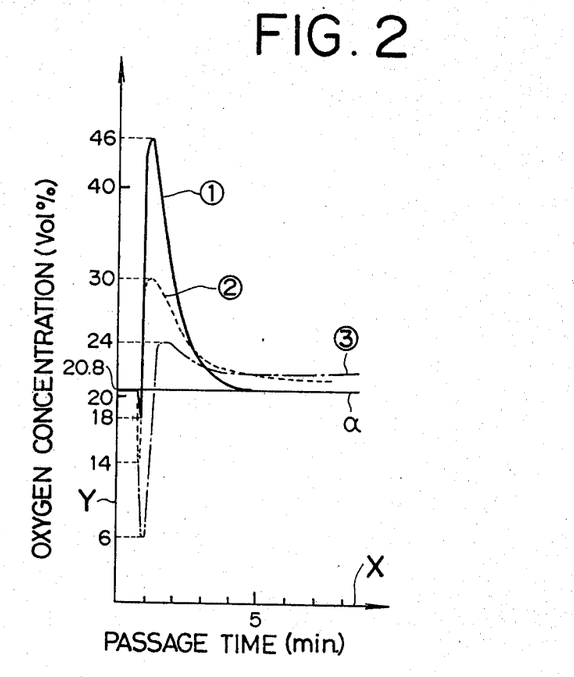
FIGS. 2, 3 and 4 are graphs showing amounts of dynamic adsorption at normal temperature (25° C.), 0° C. and −30° C., respectively, by a substantially pure Na-A type zeolite, and Na-A type zeolites containing, based on the total weight of the adsorbent, 0.5 wt %, respectively, of Fe calculated as $Fe_2O_3$.

In FIG. 2, the abscissa X indicates time, the scale being calibrated in minutes, while the ordinate Y represents oxygen outlet concentration in volume %. In order to indicate the inlet oxygen concentration, a standard line $\alpha$ is drawn at an oxygen concentration of 20.8%, i.e., the oxygen concentration in air.

In FIG. 2, curves representing changes in the outlet oxygen concentrations with the lapse of time are expressed by a solid line in the case of (1) Na-A type zeolite powders free of iron, by a broken line in the case of (2) Na-A type synthetic zeolite powder containing 0.5 wt % iron, and by a dotted broken line in the case of (3) Na-A type synthetic zeolite powders containing 1 wt % iron.

In FIG. 2, the data on change in the outlet oxygen concentration with the lapse of time of iron free Na-A type zeolite will be explained initially. With this sample, the outlet oxygen concentration decreases initially from 20.8% to 18%, then increases rapidly to 46% followed by decreasing gradually till the break through of the adsorbent which occurred about 5 minutes after the outset of passing the air.

As will be clear from the above data, in the initial stage the amount of oxygen adsorbed per unit time is larger than the amount of nitrogen adsorbed per unit time. As a result, the outlet oxygen concentration decreases. However, with lapse of a short period of time, the amount of nitrogen adsorbed per unit time exceeds that of oxygen adsorbed per unit time and the outlet oxygen concentration increases. Thereafter, the adsorbent becomes saturated with oxygen and nitrogen, and therefore the outlet oxygen concentration decreases gradually, finally reaching the inlet gas concentration.

The amount of oxygen or nitrogen adsorbed by Na-A type zeolite in a single component system of oxygen or nitrogen is 2.2 ml of oxygen or 6.2 ml of nitrogen per g of the adsorbent at 20° C. and 1 ata as described in Kitigawa and Suzuki: "Fundamentals and Design of Adsorption", page 226.

Putting these facts together, it is presumed that the reason for the initial increase in oxygen adsorption and the decrease in oxygen outlet concentration is that the speed of diffusion of oxygen into the adsorbent is higher than the speed of diffusion of nitrogen into the same adsorbent. This would account for the fact that the initial outlet concentration of oxygen is low even though the ultimate amount of nitrogen adsorbed per unit weight of adsorbent is three times higher than the amount of oxygen adsorbed.

However, separability of oxygen and nitrogen from air either at the initial or final stages of adsorption is too weak for it to be used for practical purposes from an economical viewpoint.

It has now been found that when Na-A type zeolite containing iron is prepared by the above-described method, the resulting zeolite exhibits new properties that have not previously been described. Although Na-A type zeolite free of Fe exhibits only a low oxygen selectivity, both the minimum and maximum values of the outlet oxygen concentration decrease as a result of combining Fe with the Na-A type zeolite. These values are more noticeable as the amount of Fe increases. From this it follows that the adsorption rate of nitrogen decreases with increasing iron content as compared with that of oxygen. Therefore, very high oxygen selectivity can be obtained under dynamic conditions as in adsorbing columns.

The efficiency of this invention will now be further explained with reference to FIG. 2.

With the 0.5 wt % Fe containing Na-A type zeolite, the minimum value and maximum value of the outlet oxygen concentration are 14% and 30%, respectively, and with the 1 wt % Fe-adsorbed Na-A type zeolite these values are 6% and 24% respectively.

As will be apparent from the above, the initial adsorption rate of nitrogen is decreased and that of oxygen increased as the amount of iron contained in the Na-A type increases. This means that excellent separation of oxygen and nitrogen can be achieved by contacting the selected adsorbents with air in a dynamic system in which the contact is for a short period of time during which the adsorption rate of the adsorbent exceeds the rate at which nitrogen or other gas is adsorbed. The initial adsorption step is followed by a desorption step. Most conveniently, the adsorbents are contained in a series of at least two columns which are alternately in an adsorption and desorption or regeneration stage. The process may be carried out in a continuous manner.

Further, upon determination of the amount of oxygen adsorbed by isothermal adsorption in a single component system, the results obtained under conditions of 25° C. and 1 ata are 2.2 ml/g in the case where there is no Fe, 3 ml/g in the case where there is 0.5 wt % of Fe, and 3.8 ml/g in the case where there is 1 wt % Fe. From this it can be seen that both increase in the oxygen adsorption rate and increase in the amount of oxygen adsorbed contribute to decrease in the minimum value of the outlet oxygen concentration with increased amount of Fe in the zeolite.

Further, studies of oxygen adsorption from the air using the above-described adsorbents (1) to (3) after cooling to temperatures below room temperature have led to the discovery of new phenomena which are different from those observed at room temperature.

Figure 3:
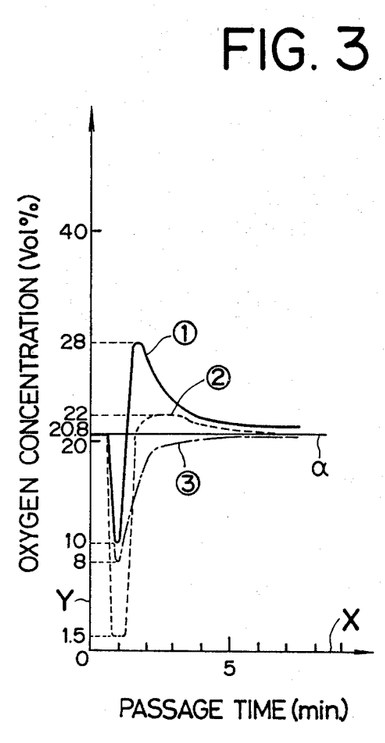
Figure 4:
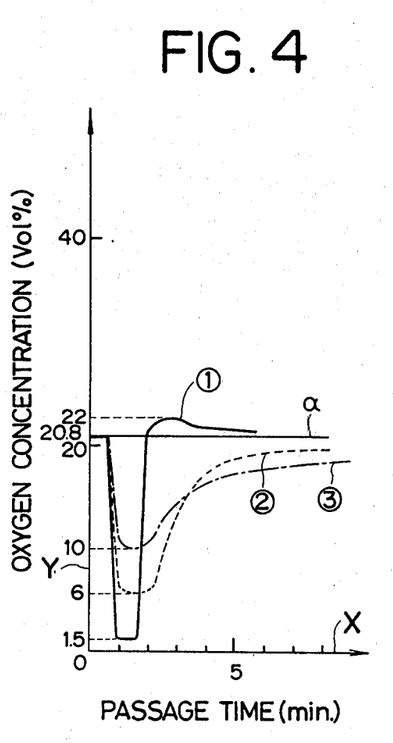

FIGS. 3 and 4 indicate data on changes in the outlet oxygen concentrations with the lapse of time at 0° C. and −30° C., respectively.

As shown in FIG. 3, all of the adsorbents (1) to (3) show decreased minimum values of the outlet oxygen concentration at 0° C. Specifically, it is 1.5 vol % with the 0.5 wt % Fe-containing zeolite and almost no oxygen can be detected at the outlet. In addition, the maximum values of the outlet oxygen concentration for the adsorbents decreases. This means that less nitrogen is being adsorbed. In fact, the figure shows that at 0° C. no nitrogen is adsorbed by Na-A type zeolite containing 1 wt % iron.

Further, as shown in FIG. 4, the iron free Na-A type zeolite is lowest in its minimum value of outlet oxygen concentration (1.5 vol %) at −30° C. and the minimum value of the oxygen concentration increases with increased amount of Fe. However, in this experiment, neither of the zeolites containing Fe show a value of outlet oxygen concentration during the time period studied which is as high as the original amount of oxygen in the air. This means that at −30° C. neither of the iron containing zeolites absorb nitrogen.

Summarizing the above, the following can be said:

(1) When Fe is adsorbed on a Na-A type zeolite the adsorption rate of nitrogen decreases considerably as compared with that of oxygen as the amount of iron increases. Very high oxygen selectivity is possible under dynamic conditions as in adsorbing columns.

(2) Na-A type zeolite and Fe-containing Na-A type zeolite both showed increased oxygen selectivity with decreased temperature. This tendency is more apparent as the amount of Fe increases. Complete oxygen selectivity under dynamic conditions can be achieved at higher temperatures with Fe-containing zeolite than Fe-free zeolite.

(3) At extremely low temperatures Fe-containing Na-A type zeolite has an adsorption rate for nitrogen which is completely negligible and the adsorption rate of oxygen decreases.

It has been further found that Na-A type zeolite does not adsorb oxygen selectively at room temperature when it is charged in an adsorbing column and the air is passed therethrough at high pressures. Instead, it behaves, like the above-described molecular sieves "5A" and "13X", as a nitrogen-selective adsorbent. Na-A type zeolites of this invention may be characterized as containing Fe obtained by contacting Na-A type zeolite with iron having a valence of at least 2 in a wet condition and then heating the zeolite at a temperature of about 450° C. to deposit Fe in and on the crystal of the Na-A type zeolite and similar products obtained by contacting the resulting Fe-dissolved zeolite crystals with an aqueous solution containing K to substitute a portion of Na in the Na-A type zeolite by K (hereafter, Fe-containing Na-K-A type zeolite). They manifest an increased oxygen selectivity. Additionally, there is an increased amount of oxygen adsorbed from a single component system if a portion of Na in pure Na-A type zeolite is substituted by K (hereafter, Na-K-A type zeolite).

As far as is known, such behavior of the Fe-containing Na-K-A type zeolite in the selective oxygen adsorption has not heretofore been described.

The Fe-containing Na-K-A type zeolites useful in this invention were prepared by treatments analogous to those carried out in the case where Fe is combined with the above-described Na-A type zeolites. The Fe-containing Na-A type zeolite was boiled in an aqueous NaCl solution for 30 minutes to remove exchangeable Fe, washed with water and then immersed in an aqueous KCl solution to substitute a portion of exchangeable Na in the Na-A type zeolite to obtain Fe-containing Na-K-A type zeolite.

Two kinds of substituted zeolites, one with a K exchange ratio of 10% and another with 20%, were prepared.

For comparison, two additional kinds of K-substituted zeolites were prepared, one with a K exchange ratio of 10% and another with a ratio of 20% using iron free Na-A type zeolite as a starting material employing the above-described K substitution method.

With respect to the influence of anions on K substitution, no change was observed when $SO_4^{2-}$, $PO_4^{2-}$, $CH_3CO_2^-$, etc., were used instead of $Cl^-$. However, the adsorptivity was lowered considerably without sufficient washing with water when $OH^-$ was used.

Hereinafter, the air separability of the Fe-containing Na-K-A type zeolite will be explained with reference to the drawings.

In the same manner as described above, using the testing apparatus shown in FIG. 1, the adsorbing column 6 was charged with (1) Fe-free Na-A type zeolite powder, (2) 10% K-substituted form of Fe-free Na-A type zeolite powder, (3) 20% K-substituted form of Fe-free Na-A type zeolite powder, (4) 1 wt % Fe-containing Na-A type zeolite powder, (5) 1 wt % Fe-containing 10% K-substituted Na-K-A type zeolite powder, or (6) 1 wt % Fe-containing 20% K-substituted Na-K-A type zeolite powder, each in an amount of 15 g. The inlet gas flow rate was adjusted to 100 N ml/min., and the inlet air pressure to 5 ata to measure changes in the outlet oxygen concentration with the lapse of time. An example of change in the outlet oxygen concentration with the passage of time at room temperature is shown in FIG. 6.

Figure 6:
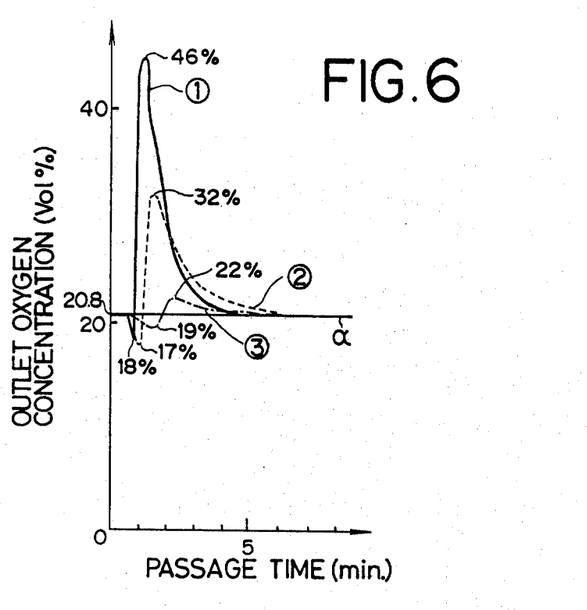
FIG. 6 is a graph showing the amounts of dynamic adsorption at 25° C. by a substantially pure Na-A type zeolite and Na-A type zeolites with 10% and 20%, respectively, of Na being substituted by K.

In FIG. 6 the abscissa X indicates time in minutes, while the ordinate Y represents oxygen concentration at the outlet, in volume %. In order to indicate the inlet oxygen concentration a standard line $\alpha$ is drawn at an oxygen concentration of 20.8%. The temperature was 23° C.

In FIG. 6, curves representing changes in the outlet oxygen concentration at the outlet in volume % are shown. The temperature was 23° C.

In FIG. 6, curves representing changes in the outlet oxygen concentrations with the lapse of time are expressed by a solid line in the case of (1) Fe-free zeolite powders, by a broken line in the case of 10% K-substituted form of the sample of (1) above, and by a dotted broken line in the case of (3) 20% K-substituted form of the sample of (1) above.

The data on change in the outlet oxygen concentration with the lapse of time of the Fe-free Na-A type zeolite 1 are analogous to the data explained in FIG. 2 and therefore explanation is omitted here.

As will be apparent from FIG. 6, even if a portion of Na in the Na-A type zeolite is replaced with K, no improvement is observed in its adsorptivity. The data of 10% K-substituted form 2 show maximum and minimum values of the outlet oxygen concentration of 32% and 17% respectively, while those of 20% K-substituted form 3 show these values of 22% and 19% respectively. It should be noted that with the 30% K-substituted form, adsorption of oxygen and nitrogen no longer occurs.

The efficiency of the Fe-containing Na-K-A type zeolite according to this invention will be explained with reference to FIG. 7.

Figure 7:
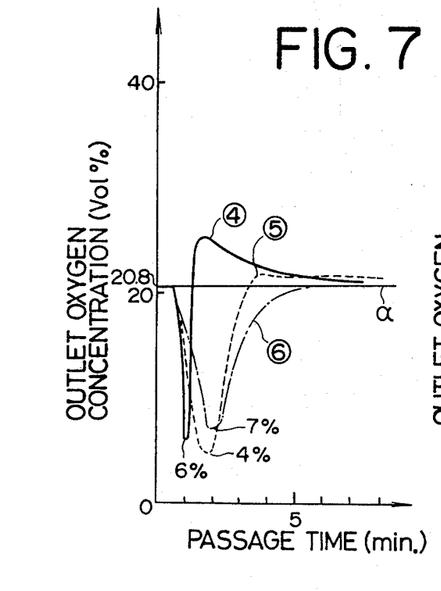
FIG. 7 is a graph showing the amounts of dynamic adsorption at 25° C. by substantially pure Na-A type zeolite containing 1 wt % of Fe, Na-K-A type zeolite containing 1 wt % of Fe with 10 % of Na being substituted by K and Na-K-A type zeolite having adsorbed thereon 1 wt % of Fe with 20 % of Na being substituted by K.

FIG. 7, like FIG. 6, shows the change in the outlet oxygen concentration, the lapse of time at room temperature (25° C.) with the abscissa and ordinate lines as well as the standard line $\alpha$ having the same meanings as those in FIG. 6.

In FIG. 7, the 1 wt % Fe-containing Na-A type zeolite shows a minimum value of the oxygen outlet concentration which is lowered to 6% without K-substitution. It will be seen that it is improved considerably as compared with the above-described Fe-free form. Further, the minimum value of the outlet oxygen concentration of the 1 wt % Fe-containing, 10% K-substituted Na-K-A type zeolite 5 decreases to 4%, thus showing high oxygen selectivity. With the 1 wt % Fe-containing, 20% K-substituted Na-K-A type zeolite 6, the minimum value of the outlet oxygen concentration is elevated to 7% but it should be noted that the outlet oxygen concentration in the air of 20.8%, i.e., the standard line a, which means substantially no nitrogen is adsorbed and the adsorbent can function to provide substantially pure oxygen when it is released from the adsorbent.

The 1 wt % Fe-containing, 10% K-substituted Na-K-A type zeolite was used in the separation of oxygen and nitrogen from the air under the adsorption conditions at lower temperatures. A further increase in efficiency was observed by operating under low temperature conditions compared with the effects attained by operations at normal temperature. This will be explained with reference to FIG. 8.

Figure 8:
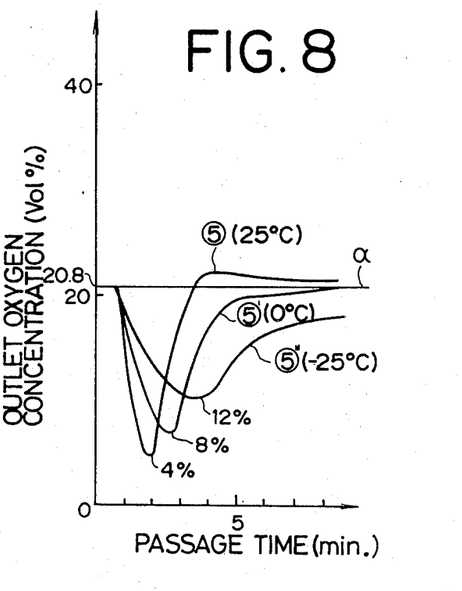
FIG. 8 is a graph showing the amounts of dynamic adsorption at 25° C., 0° C. and −25° C., respectively, by the Na-K-A type zeolite containing 1 wt % of Fe with 10% of Na being substituted by K.

In FIG. 8, the data of 5 at 25° C. are the same as the ata for 5 in FIG. 7. the curve 5' represents the data obtained when conducting an adsorption operation at 0° C. The value of the outlet oxygen concentration increases to 8% but no adsorption of nitrogen occurs. Further, 5" is a curve representing the data obtained in carrying out adsorption operation at −25° C. according to which the minimum value of the outlet oxygen concentration is further elevated to 12%. This means that the nitrogen stream exiting the adsorption column still contains a relatively large amount of oxygen. However, selectivity is retained so that substantially pure oxygen can be obtained by desorption from the column.

Summarizing the above, the following can be said:
(1) When Fe is adsorbed on a Na-A type zeolite, selectivity to oxygen and the like in its adsorption from a two-component system containing oxygen and nitrogen such as the air at normal temperature improves. Substitution of a portion of Na-in the Fe-containing Na-A type zeolite further improves its selectivity and achieves complete oxygen selectivity under dynamic conditions as in adsorbing columns.
(2) Partial K-substituted forms of zeolite do not adsorb nitrogen at low temperatures. K-substitution in order to obtain complete oxygen selectivity must be at high ratios as the adsorption temperature increases, while at low temperatures K-substitution at low ratios is sufficient.
(3) The reason why the peak value of the outlet oxygen concentration is high (in other words, separation of oxygen from nitrogen is insufficient) on the lower temperature side and at high K-substitution ratio is that mass transfer speed of oxygen onto the adsorbent is too small as compared with space velocity of the air passing through. In such case, it is necessary to decrease space velocity of the air in the adsorbing column.

The iron containing oxygen adsorbents of this invention are new. Among their advantageous features is the fact that they adsorb oxygen in an amount from 1.5 to 2 times larger than that adsorbed by the Fe-free Na-A type zeolite.

The oxygen adsorbent of this invention can be widely applied in a variety of fields. For example, when it is applied to an oxygen concentration apparatus making use of molecular sieves it is applicable either to temperature swing type or to pressure swing type and provides an oxygen adsorptivity which is greatly superior to that of the conventional $N_2$ adsorption type molecular sieves, thereby permitting miniaturization of apparatus used and reduction in the costs for the concentration, separation and purification of oxygen.

The adsorbent for oxygen of this invention can be used to remove oxygen from gaseous mixtures of oxygen and nitrogen having different compositions from air as well as from gaseous mixtures containing oxygen and gases other than nitrogen. In other words, this invention provides a very cheap agent for the adsorption and removal of oxygen from a wide variety of gaseous mixtures.

It should be noted that under the conditions of flow rate (100 N ml/min.) and pressure (5 ata) as illustrated and described above, almost complete oxygen selectivity is possible at 0° C. with Fe-containing, 10% K-unsubstituted Na-A type zeolite and at room temperature with 1 wt % Fe-dissolved, 20% K-substituted Na-K-A type zeolite. Such selectivity is possible while operating at other flow rates, pressures, temperatures and amounts of Fe and K. Typically, the flow rate may vary from about 16 to 500 N ml/min., the pressure from about 1 to 11 ata, and the temperature from −50° C. to 30° C. However, appreciable variation in flow rate and pressure can be tolerated without adverse effect.

How the outlet oxygen concentration will vary, depending upon (1) flow rate, (2) pressure, (3) cross-section of adsorbing column, (4) length of the adsorbing column and the like factors under the above-described conditions, can be readily ascertained by one skilled in the art applying standard calculations as described, for example, by Kitigawa and Suzuki: "Fundamentals and Design of Adsorption", p. 89–92.

Under conditions of higher temperature, low ratio of K-substitution, low amount of dissolved Fe, the adsorption rate of nitrogen reaches levels which are not negligible, but the products of the invention can still be successfully employed under conditions which can be readily determined by those skilled in the art by applying the techniques of this disclosure to standard methods of analysis and calculation. All these results show that with increased amounts of dissolved iron and increased ratio of K-substitution, or decreased temperature, there is a greater difference in coefficient of mass transfer between oxygen and nitrogen. This means that the processes of the invention can be conducted at lower flow rates. The flow rates must be increased when these values are inverted.

At any rate, once the data on change in the outlet oxygen concentration with lapse of time as shown in FIGS. 2 and 4 and 6 to 8 are obtained, design of adsorbing column and of its operation can be made within the knowledge of the conventional art.

The adsorbents of this invention will normally contain from about 0.1 to 1 wt % calculated as $Fe_2O_3$ of iron with a valence of at least 2. For most operating conditions, the preferred wt % will be from 0.5 to 0.7. With those adsorbents of the invention in which the Na is replaced with K, the replacement may be as high as 50%. Some improvements are achieved with even small amounts of replacement, but for most purposes the preferred replacement rate is 10 to 20%.

Suitable adsorbents for a wide variety of operating conditions can be prepared with Fe and K content in the foregoing ranges. Some variations can be tolerated without appreciable adverse effects. Generally, it is preferred to utilize adsorbents with relatively high amounts of iron and with K replacement up to about 20%. These adsorbents, as will be apparent from the figures, permit better selectivity at higher temperatures.

Adsorbents can be prepared which will be useful over a wide temperature range which may be from about −50° C. to 30° C. The preferred temperature range is from −30° C. to 30° C. This means that a wide variety of cooling techniques can be utilized in the practice of the invention so that the most efficient use of available equipment is possible.

Hereinbelow, the process for the selective adsorption and separation of oxygen according to this invention will be explained with reference to a preferred embodiment in which the process is applied to a pressure swing type oxygen producing apparatus.

Figure 5:
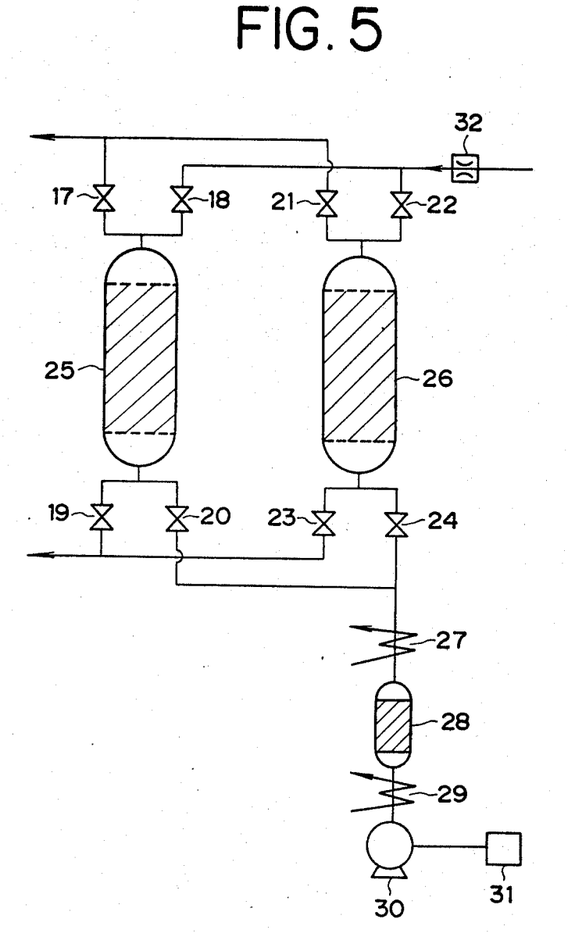
FIG. 5 shows a flow chart of a preferred embodiment of this invention.

FIG. 5 shows a schematic illustration of a pressure swing type oxygen producing apparatus. In FIG. 5, reference numerals 17-24 are automatic change-over valves, 25, 26 are adsobing columns packed with the oxygen adsorbent used in this invention. There is a heat exchanger 27 for cooling to low temperature, 28 is an adsorbing column for dehumidifying and removing carbonaceous gas, 29 is a precooler, 30 is an air compressor, 31 is an air strainer and 32 is a throttle valve. Control device and the like for controlling the automatic change-over valves, etc., are not shown.

For purposes of explanation, assume that the adsorbing column 25 is in the step of adsorption and the adsorbing column 26 in the step of regeneration. Air is supplied through the air strainer 31 where airborne particles are removed. It is pressurized by air compressor 30 and then predehydrated and cooled to room temperature in the precooler 29. After dehumidifying and removing carbonaceous gas in the adsorbing column 28, the air is further cooled in the heat exchanger 27° to −30° C. and is fed via the valve 20 to the adsorbing column 25 in which oxygen in the pressurized air is adsorbed selectively by the adsorbent and the air is enriched with nitrogen. This nitrogen-rich air is fed out of the adsorbing column 25 through the valve 17. At this time the valves 17, 20 are opened and the valves 18, 19 are closed.

The adsorbent in the adsorbing column 26 is regenerated under reduced pressure while adsorption operation is under way in the adsorbing column 25. To accomplish this, the valves 21, 22 and 24 are closed and the valve 23 is open. The pressure within the adsorbing column 26 is reduced to atmospheric or subatmospheric pressure to desorb a portion of the adsorbate adsorbed during the step of adsorption and air enriched with oxygen exits the adsorbing column via the valve 23.

As soon as the step of pressure reduction is completed the valve 22 is opened and the air is fed into the adsorbing column 26 via the throttle valves 32 and the valve 22 by means of a ventilating means (not shown) to operate a step of scavenging in which oxygen-rich air-gap gas and the remaining adsorbate in the adsorbing column are brought out via the valve 23.

As soon as the above step is completed the adsorbing column 26 is subjected to the step of adsorption and at the same time the adsorbing column 25 is subjected to the step of regeneration.

As stated above, the steps of adsorption and regeneration are repeated continually to take out oxygen-rich air and (or) nitrogen-rich air.

According to a presently preferred embodinemt of this invention, an adsorbing column having an inner diameter of 50 mm and a length of 600 mm is packed with 1 kg of 1 wt % Fe-dissolved Na-A type zeolite molded into beads about 1 mm in diameter using a conventional tablet machine, and adsorption and separation of oxygen is carried out by passing the mixed gas through the selected zeolite under low temperature conditions of inlet air flow rate of 16 N ml/min. to 100 N ml/min. and a temperature of 0° C. to 30° C. with the pressure of the air supplied being swung between 1 and 5 ata.

The product nitrogen concentration, the amount of nitrogen separated downstream of the valves 17 and 21, the product oxygen concentration, and the amount of oxygen recovered when the process as shown in FIG. 5 is operated under the conditions described in the previous paragraph are shown in Table 1.

At 25° C. no product nitrogen could be obtained downstream of the valves 17 and 21 and 45% of oxygen passed in the case where pure Na-A type zeolite was used. This is considered to be due to the fact that the slight decrease in the oxygen concentration in the initial stage of adsorption observed in the small air separation testing apparatus shown in FIG. 1 is set off by the nitrogen adsorption which followed. Therefore, higher inlet flow speed in necessary to effect separation at 25° C.

TABLE 1

| | |
|---|---|
| Shape of Adsorbing Column: | 50 mm in inner diameter and 60 mm in length |
| Amount of Adsorbent Charged: | 1 kg |
| Pressure Swing: | 1 to 5 ata |
| Inlet Air Flow Rate: | 16 N ml/min. |
| Cycle Time: | 5 min. |
| Temperature of Adsorbing Col.: | 0° C. |
| Product $N_2$ Concentration: | 99% |
| Product $N_2$ Recovery: | 40 l/cycle |
| Product $O_2$ Concentration: | 82% |
| Product $O_2$ Recovery: | 11 l/cycle |

This procedure was repeated under the same conditions with a mixed gas containing 20 vol % oxygen and 80 vol % argon. The concentration of recovered argon was 99.9%.

Further, the same adsorption separation test as above except that the inlet air flow rate was set up to 18 N ml/min. was repeated using 1 wt % Fe-dissolved 20% K-substituted Na-K-A type zeolite. The temperature was at room temperature (25° C.). The data obtained are shown in Table 2.

TABLE 2

| | |
|---|---|
| Shape of Adsorbing Column: | 50 mm in inner diameter and 600 mm in length |
| Amount of Adsorbent Charged: | 1 kg |
| Pressure Swing: | 1 to 5 ata |
| Inlet Air Flow Rate: | 28 N ml/min. |
| Cycle Time: | 5 min. |
| Temperature of Adsorbing Col.: | 25° C. |
| Product $N_2$ Concentration: | 96% |
| Product $N_2$ Recovery: | 13 l/cycle |
| Product $O_2$ Concentration: | 68% |
| Product $O_2$ Recovery: | 5 l/cycle |

What is claimed is:

1. An adsorbent useful for separating oxygen from mixed gases containing it which comprises a Na-A type zeolite containing, based on the total weight of adsorbent, from 0.1 wt % to 1 wt % calculated as $Fe_2O_3$, of iron with a valence of at least 2.

2. An adsorbent of claim 1 containing from 0.5 wt % to 0.7 wt % of iron.

3. An adsorbent of claim 1 is which up to 50% of the Na in the Na-A type zeolite is replaced with K.

4. An adsorbent of claim 2 in which up to 50% of the Na in the Na-A type zeolite is replaced with K.

5. An adsorbent of claim 1 in which from 10% to 20% of the Na in the Na-A type zeolite has been replaced with K.

6. An adsorbent of claim 2 in which from 10% to 20% of the Na in the Na-A type zeolite has been replaced with K.

7. A process for separating oxygen from a mixture of gases containing it which comprises contacting the mixture with an adsorbent which is a Na-A type zeolite containing, based on the total weight of adsorbent, from 0.1 wt % to 1 wt % calculated as $Fe_2O_3$, of iron with a valence of at least 2 at a temperature of from $-50°$ C. to 30° C. to adsorb oxygen selectively from the adsorbent.

8. A process as in claim 7 wherein the mixture is air.

9. A process as in claim 7 wherein the mixture is contacted with the adsorbent at a flow rate of from 16 N ml/min. to 500 N ml/min. at a pressure of from 1 to 11 atmospheres absolute.

10. A process as in claim 9 wherein the mixture is air.

11. A process as in claim 7 wherein the mixture is contacted with the adsorbent at a temperature of from 0° C. to 30° C., a pressure of from 1 to 5 atmospheres absolute and a flow rate of from 16 N ml/min. to 100 N ml/min.

12. A process as in claim 11 wherein the mixture is air.

13. A continuous process for separating oxygen from a mixture of oxygen and nitrogen which comprises contacting the mixture with an adsorbent which is a Na-A type zeolite containing, based on the total weight of adsorbent, from 0.1 wt % to 1 wt % calculated as $Fe_2O_3$, of iron with a valence of at least 2 by passage of the mixture through a column of the adsorbent in the adsorption stage at a temperature of from $-50°$ C. to 30° C., a pressure of from 1 to 11 atmospheres absolute and a flow rate of from 16 to 500 N ml/min. to selectively adsorb the oxygen and thereafter decreasing the pressure to desorb the oxygen from the adsorbent in the desorption stage.

14. A process as in claim 13 wherein the mixture is air.

15. A continuous process as in claim 13 conducted in a series of at least two columns alternately in the adsorption and desorption stage.

16. A process as in claim 15 wherein the mixture is air.

17. A continuous process as in claim 13 wherein the mixture is contacted with the adsorbent in the adsorption stage at a flow rate of from 16 N ml/min. to 100 N ml/min., a temperature of from 0° C. to 30° C. and a pressure of from 1 to 5 atmospheres absolute.

18. A process as in claim 17 wherein the mixture is air.

19. A process as in claim 17 conducted in a series of at least two columns alternately in the adsorption and desorption stages.

20. A process as in claim 19 in which up to 50% of the Na in the Na-A type zeolite is replaced with K.

* * * * *

UNITED STATES PATENT AND TRADEMARK OFFICE
CERTIFICATE OF CORRECTION

PATENT NO. : 4,453,952

DATED : June 12, 1984

INVENTOR(S) : IZUMI ET AL

It is certified that error appears in the above—identified patent and that said Letters Patent is hereby corrected as shown below:

On the title page:

[73] Assignee: TDK Corporation, Tokyo, Japan should read

[73] Assignee: MITSUBISHI JUKOGYO KABUSHIKI KAISHA

Signed and Sealed this

Eleventh Day of June 1985

[SEAL]

Attest:

DONALD J. QUIGG

Attesting Officer     Acting Commissioner of Patents and Trademarks